United States Patent
Elbacher et al.

(10) Patent No.: US 9,528,608 B2
(45) Date of Patent: Dec. 27, 2016

(54) SEALING ELEMENT

(71) Applicant: Paul Mueller GmbH & Co. KG Unternehmensbeteiligungen, Nuremberg (DE)

(72) Inventors: Manfred Elbacher, Nuremberg (DE); Andreas Radke, Nuremberg (DE)

(73) Assignee: Paul Mueller GmbH & Co. KG Unternehmensbeteiligungen, Nuremberg (DE)

( * ) Notice: Subject to any disclaimer, the term of this patent is extended or adjusted under 35 U.S.C. 154(b) by 0 days.

(21) Appl. No.: 14/777,570

(22) PCT Filed: Mar. 17, 2014

(86) PCT No.: PCT/DE2014/100090
§ 371 (c)(1),
(2) Date: Sep. 16, 2015

(87) PCT Pub. No.: WO2014/146643
PCT Pub. Date: Sep. 25, 2014

(65) Prior Publication Data
US 2016/0273658 A1    Sep. 22, 2016

(30) Foreign Application Priority Data
Mar. 17, 2013 (DE) .................... 20 2013 101 140 U

(51) Int. Cl.
*F16J 15/447*    (2006.01)
(52) U.S. Cl.
CPC .......... *F16J 15/4476* (2013.01); *F16J 15/4472* (2013.01); *F16J 15/4474* (2013.01); *F16J 15/4478* (2013.01)
(58) Field of Classification Search
CPC .... F16J 15/447; F16J 15/4472; F16J 15/4474; F16J 15/4476; F16J 15/4478; F01D 11/00; F01D 11/02; F01D 11/025; F01D 11/04; F01D 11/06
See application file for complete search history.

(56) References Cited

U.S. PATENT DOCUMENTS

| | | | |
|---|---|---|---|
| 4,458,957 A | 7/1984 | Greener | |
| 5,174,583 A | 12/1992 | Orlowski et al. | |
| (Continued) | | | |

FOREIGN PATENT DOCUMENTS

| | | |
|---|---|---|
| DE | 1 109 470 B | 6/1961 |
| DE | 38 33 690 A1 | 4/1990 |
| (Continued) | | |

OTHER PUBLICATIONS

International Search Report of PCT/DE2014/100090, mailed Oct. 9, 2014.

*Primary Examiner* — Gilbert Lee
(74) *Attorney, Agent, or Firm* — Collard & Roe, P.C.

(57) ABSTRACT

A sealing element for sealing a cylindrical inner surface of a first machine component and a cylindrical outer surface of a second machine component includes an inner ring, an outer ring arranged coaxially with respect to the inner ring, and a sealing gap, which is formed by an exterior lateral face of the inner ring and an interior lateral face of the outer ring. In an axial section through the common axis of the inner ring and the outer ring the sealing gap has a profile having an inlet section as a first end portion of the sealing gap having a first radius to the common axis; an outlet section as a second end portion of the sealing gap having a second radius to the common axis, wherein the second radius is smaller than the first radius; and a meander section, which adjoins the inlet section and which has a monotonically decreasing radius.

6 Claims, 2 Drawing Sheets

(56) References Cited

U.S. PATENT DOCUMENTS

| | | | | |
|---|---|---|---|---|
| 5,951,020 A * | 9/1999 | Orlowski | ............ | F16J 15/4474 |
| | | | | 277/419 |
| 7,624,989 B2 | 12/2009 | Hartmann et al. | | |
| 7,878,508 B2 * | 2/2011 | Nobrega | ............... | F04D 29/106 |
| | | | | 277/352 |
| 8,820,749 B2 * | 9/2014 | Tones | ................... | F16J 15/4478 |
| | | | | 277/411 |
| 9,404,584 B2 * | 8/2016 | Nobrega | ............. | F16J 15/4474 |

FOREIGN PATENT DOCUMENTS

| | | |
|---|---|---|
| EP | 0 232 963 A1 | 8/1987 |
| GB | 274 049 A | 5/1928 |
| WO | 2005/059412 A1 | 6/2005 |

\* cited by examiner

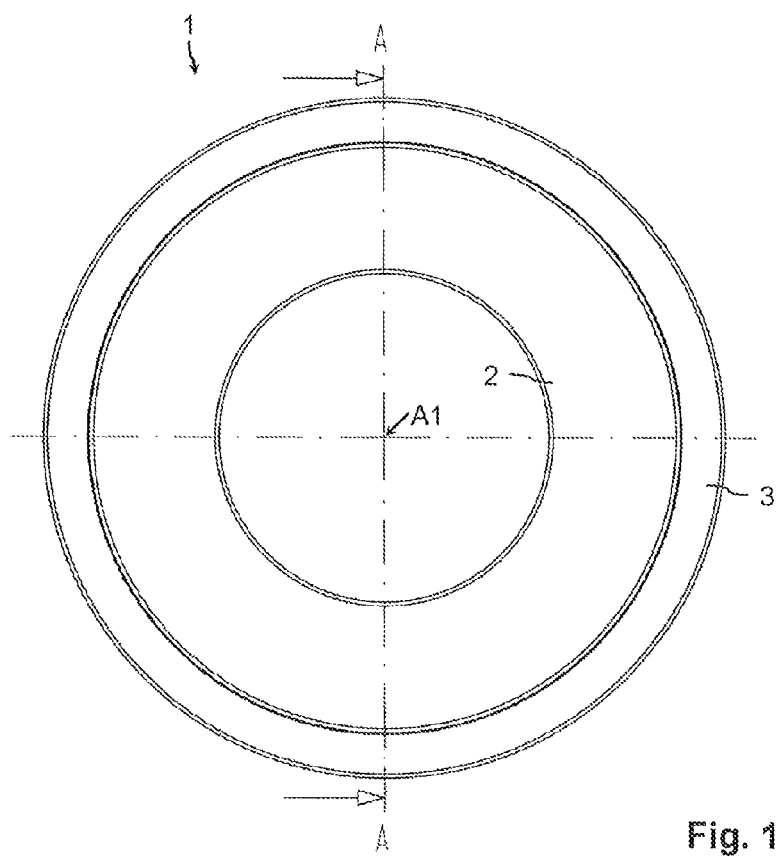
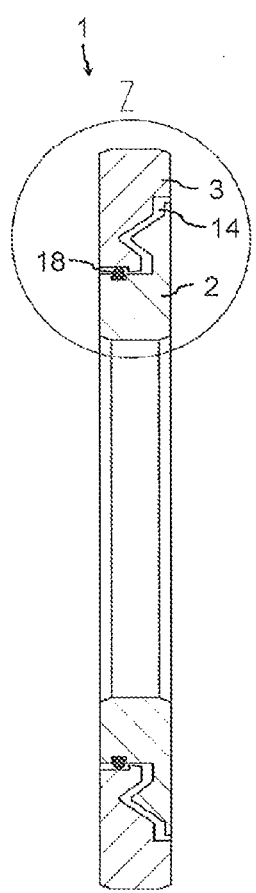
Fig. 1
Fig. 2

SEALING ELEMENT

CROSS REFERENCE TO RELATED APPLICATIONS

This application is the National Stage of PCT/DE2014/100090 filed on Mar. 17, 2014, which claims priority under 35 U.S.C. §119 of German Application No. 20 2013 101 140.1 filed on Mar. 17, 2013, the disclosure of which is incorporated by reference. The international application under PCT article 21(2) was not published in English.

The invention relates to a sealing element for sealing a cylindrical internal face of a first machine component and a cylindrical external face of a second machine component.

Sealing elements which are configured as gap or labyrinth seals are known from the prior art. Non-contacting sealing is performed in these gap or labyrinth seals by providing a sealing gap which is configured so as to be generally meandering. However, there is the potential for surrounding media (in particular liquids) to enter into this sealing gap. Consequently, gap or labyrinth seals are not absolutely tight but do enable surrounding media to pass through to some extent.

The invention is based on the object of providing a sealing element having improved sealing properties.

This object is achieved by a sealing element having the features described herein. Additional advantageous embodiments are also described herein.

The sealing element according to the invention serves for sealing a cylindrical internal face of a first machine component and a cylindrical external face of a second machine component. The sealing element according to the invention has an inner ring, an outer ring which is disposed coaxially with the inner ring, and a sealing gap which is formed by an outer shell of the inner ring and an inner shell of the outer ring. The sealing gap in an axial section through the common axis of the inner ring and of the outer ring has a profile with at least the following profile portions: an entry portion, an exit portion, and a meandering portion. The entry portion represents a first end portion of the sealing gap, having a first radius to the common axis. The exit portion represents a second end portion of the sealing gap, having a second radius to the common axis. The second radius is smaller than the first radius. The meandering portion adjoins the entry portion and has a monotonously decreasing radius.

Monotonously decreasing here is to be understood in the mathematical sense, that is to say that the spacing of the profile of the sealing gap from the common axis decreases, commencing from the entry portion, or said spacing remains constant, respectively.

In this way, liquids which enter into the sealing gap from the entry side are conveyed back to the entry portion on account of centrifugal forces during rotation of the machine elements to be sealed. That is to say that so-called recirculation takes place. This in turn improves the sealing properties of the sealing element.

The meandering portion is understood to be a portion of the sealing gap in which the sealing gap has a meandering profile. Meandering here is understood to be both a zigzag-type configuration of the profile, in particular in the shape of rectangular and/or triangular loops, as well as a serpentine configuration of the profile.

On account of the above-described configuration of the sealing gap, the sealing element has large axial play. Moreover, so-called disintegrating assembly is possible (separate assembly of the inner ring and of the outer ring). This increases ease of assembly.

In one advantageous embodiment, the sealing element furthermore has an annular seal which is disposed in the sealing gap. On account of this annular seal, the throughflow of surrounding liquids is impeded. The annular seal in particular also improves the sealing properties in the static state of the machine components to be sealed, that is to say when there is no rotation movement between the machine components to be sealed and thus the recirculation described in the preceding paragraph does not take place. Consequently, this embodiment of the invention has improved sealing properties both in the static state as well as in the rotating state of the machine elements to be sealed.

The annular seal here is advantageously positioned in the sealing gap in such a manner that the annular seal either contacts only the inner ring or only the outer ring. In this way, the sealing element represents a non-contacting sealing element also in the embodiment having the annular seal.

Particularly advantageously, the annular seal is disposed in the sealing gap between the meandering portion and the exit portion. In this way, recirculation by the meandering portion in the direction of the entry portion is not impeded by the presence of the annular seal.

The annular seal may be positioned in a groove of the outer shell of the inner ring and/or in a groove of the inner shell of the outer ring. This enables exact positioning of the annular seal in a particularly stable manner in terms of location. Moreover, inadvertent displacement of the annular seal during operation of the sealing element is effectively prevented.

In one further advantageous embodiment, the profile of the sealing gap has a constriction (reduction in the height of the sealing gap) between the meandering portion and the annular seal. This constriction produces a further resistance to surrounding media which have entered into the sealing gap. In combination with the annular seal which is disposed so as to adjoin said constriction, permeability of the sealing element to surrounding media is further reduced, thus further improving the sealing properties.

In one further advantageous embodiment, the profile of the sealing gap has a widening (broadening of the sealing gap, enlargement of the height of the sealing gap) between the annular seal and the exit portion. On account of the widening which in the direction of the exit portion adjoins the annular seal, capillary forces which would otherwise potentially arise can be counteracted. On account of the widening, it is not possible for surrounding liquids which have entered into the sealing gap from the direction of the entry portion to be quasi sucked past the annular seal (on account of capillary forces).

In one advantageous embodiment, the meandering portion is formed at least by a first pair of conical part-surfaces of the inner ring and of the outer ring which run so as to be mutually parallel, and by a second pair of conical part-surfaces of the inner ring and of the outer ring which run so as to be mutually parallel. The first and the second pair here are configured so as to be conically opposed to one another. A meandering portion of this type enables a large sealing gap length, leading to improved tightness, on the one hand, and unimpeded recirculation back to the entry portion of surrounding media which have entered, on the other hand.

Particularly advantageously, the cone angle of the first pair and the cone angle of the second pair in terms of value are similar (that is to say that the value varies by 10% max.) or in terms of value are identical. In this way, particularly uniform recirculation of the surrounding media having entered is achieved.

Recirculation or drainage, respectively, of surrounding media having entered may be further improved by providing a drain groove in the outer ring.

The sealing element may be manufactured from both metallic materials, in particular a steel or aluminum material, as well as from a polymer material, in particular polyoxymethylene. It is also possible for the inner ring and the outer ring to be composed of different materials.

The invention is further explained by means of exemplary embodiments in the figures of the drawing, in which:

FIG. 1 shows a side view of a sealing element;

FIG. 2 shows an axial section of the sealing element, through the common axis along the sectional plane A-A from FIG. 1.

Figure 3:
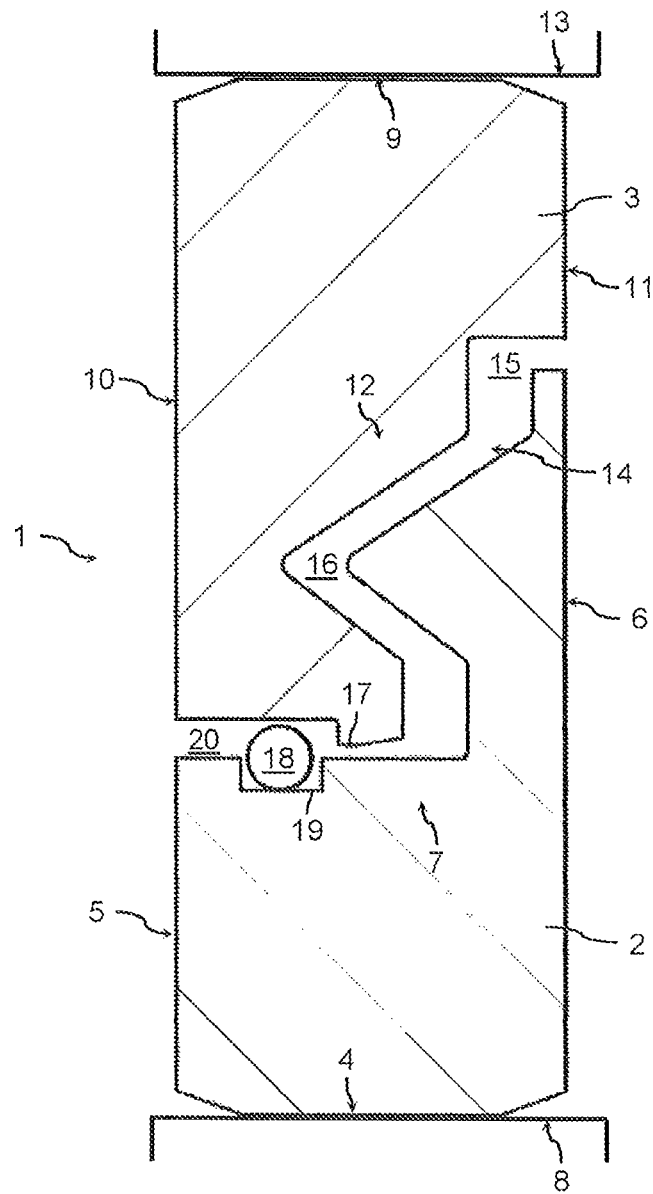
FIG. 3 shows an enlarged detail of the region Z from FIG. 2, with surfaces of machine components which are to be sealed being additionally illustrated.

The sealing element 1 illustrated in FIGS. 1 to 3 has an inner ring 2 and an outer ring 3 which is disposed coaxially with the former. The inner ring 2 and the outer ring 3 are disposed coaxially with the common axis A1.

The inner ring 2 has an inner shell 4 which runs in a substantially axial manner, a first lateral face (end face) 5, a second lateral face (end face) 6, and an outer shell 7. The inner shell 4 is connected to a cylindrical external face 8 of a machine component. The first lateral face 5 and the second lateral face 6 run in a substantially radial manner. The first lateral face 5 has a smaller width than the second lateral face 6.

The outer ring 3 has an outer shell 9 which runs in a substantially axial manner, a first lateral face (end face) 10, a second lateral face (end face) 11, and an inner shell 12. The outer shell 9 is connected to a cylindrical internal face 13 of a further machine component. The first lateral face 10 and the second lateral face 11 run in a substantially radial manner. The first lateral face 10 has a larger width than the second lateral face 11.

The inner shell 12 of the outer ring 3 and the outer shell 7 of the inner ring 2 between them form a sealing gap 14. In other words, the inner shell 12 of the outer ring 3 and the outer shell 7 of the inner ring 2 are not in mutual contact, but there is a remaining annular gap, namely the sealing gap 14.

The profile of the sealing gap 14—and therefore the sealing gap 14 itself—which is illustrated in FIG. 2 and FIG. 3 has an end portion in the region of the second lateral face 6 or 11, respectively. This end portion hereunder will be referred to as the entry portion 15. This entry portion 15 as a spacing from the common axis A1 has a spacing which corresponds to the height of a first radius. The entry portion 15 is configured as an axially running gap which in the immediate entry region has a reduced height. This reduced height in the immediate entry region is intended to shield the sealing gap 14 and improves the sealing properties of the sealing element 1.

The meandering portion 16 adjoins the entry portion 15. This meandering portion 16 has a radius which decreases in a monotonous manner. In other words, in the region of the meandering portion 16 the spacing of the sealing gap 14 from the common axis A1 decreases in a monotonous manner. Surrounding liquids, which enter into the sealing gap 14 from the side of the entry portion 15, are recirculated in this way during rotation of the machine parts to be sealed. The meandering portion 16 illustrated in FIGS. 2 and 3 consists essentially of a first pair of conical part-surfaces of the inner shell 12 of the outer ring 3 and of the outer shell 7 of the inner ring 2, which run so as to be mutually parallel, and a second pair of conical part-surfaces of the inner shell 12 of the outer ring 3 and of the outer shell 7 of the inner ring 2, which run so as to be mutually parallel. The first and the second pair are configured so as to be conically opposed to one another, such that a zigzag-type profile of the sealing gap 14 is created in this portion.

A constriction 17 of the sealing gap 14 adjoins the meandering portion 16. The constriction 17 represents a barrier to entering surrounding liquids and thus improves the sealing properties of the sealing element 1.

An annular seal 18 adjoins the constriction 17. The annular seal 18 is disposed in the sealing gap 14. More precisely, the annular seal 18 is positioned in a groove 19 which is configured in the inner ring 2. In the illustrated exemplary embodiment, the annular seal 18 is configured as an O-ring. The annular seal 18 impedes the throughflow of surrounding liquids which have entered into the sealing gap 14. In particular, the annular seal 18 improves the sealing properties also in the static state of the machine components to be sealed, that is to say when no rotation movement is performed between the machine components to be sealed. A gap remains between the annular seal 18 and the outer ring 3, such that no contact takes place between the annular seal 18 and the outer ring 3. On account thereof, the sealing element 1 is configured as a non-contacting seal.

An exit portion 20 adjoins the annular seal 18. The exit portion 20 is an end portion of the sealing gap 14 in the region of the first lateral face 5 or 10, respectively. The exit portion 20 is configured as an axially running portion. The exit portion 20 as a spacing from the common axis A1 has a spacing which corresponds to the height of a second radius. The second radius is smaller than the first radius. The height of the sealing gap 14 in the region of the exit portion 20 here is comparatively large, that is to say at least larger than the height of the sealing gap 14 in the region of the constriction 17. On account thereof, the occurrence of capillary forces which could deflect entering surrounding liquids around the annular seal 18 is counteracted.

A drain groove which is incorporated in the outer ring 3 is not illustrated in the figures.

LIST OF REFERENCE SIGNS

1 Sealing element
2 Inner ring
3 Outer ring
4 Inner shell
5 First lateral face
6 Second lateral face
7 Outer shell
8 Cylindrical external face
9 Outer shell
10 First lateral face
11 Second lateral face
12 Inner shell
13 Cylindrical internal face
14 Sealing gap
15 Entry portion
16 Meandering portion
17 Constriction
18 Annular seal
19 Groove
20 Exit portion
A1 Common axis

The invention claimed is:

1. A sealing element for sealing a cylindrical internal face of a first machine component and a cylindrical external face of a second machine component, the sealing element having an inner ring, an outer ring which is disposed coaxially with the inner ring, and a sealing gap which is formed by an outer shell of the inner ring and an inner shell of the outer ring;
  wherein the sealing gap in an axial section through the common axis of the inner ring and of the outer ring has a profile with the following profile portions:
    an entry portion as a first end portion of the sealing gap, having a first radius to the common axis;
    an exit portion as a second end portion of the sealing gap, having a second radius to the common axis, wherein the second radius is smaller than the first radius; and
    a meandering portion which adjoins the entry portion and which has a monotonously decreasing radius;
  wherein the sealing element furthermore has an annular seal disposed in the sealing gap between the meandering portion and the exit portion;
  wherein the profile of the sealing gap has a constriction between the meandering portion and the annular seal; and
  wherein the annular seal is positioned in the sealing gap in such a manner that the annular seal either contacts only the inner ring or only the outer ring.

2. The sealing element as claimed in claim 1, wherein the outer shell of the inner ring and/or the inner shell of the outer ring have/has a groove in which the annular seal is disposed.

3. The sealing element as claimed in claim 1, wherein the profile of the sealing gap has a widening between the annular seal and the exit portion.

4. The sealing element as claimed in claim 1, wherein the meandering portion is formed at least by one first pair of conical part-surfaces of the inner ring and of the outer ring which run so as to be mutually parallel, and by a second pair of conical part-surfaces of the inner ring and of the outer ring which run so as to be mutually parallel; and
  wherein the first and the second pair are configured so as to be conically opposed to one another.

5. The sealing element as claimed in claim 4, wherein the cone angle of the first pair and the cone angle of the second pair in terms of value are similar or identical.

6. The sealing element as claimed in claim 1, wherein the outer ring furthermore has a drain groove.

\* \* \* \* \*